Patented Feb. 1, 1944

2,340,452

UNITED STATES PATENT OFFICE 2,340,452

COMPOSITION FOR USE AS ADHESIVE

Cyril Leonard Child, Robert Bertram Fisher Frank Clarke, and Bernard James Habgood, Blackley, Manchester, England, assignors to Imperial Chemical Industries Limited, a corporation of Great Britain No Drawing. Application October 7, 1941, Serial No. 414,036. In Great Britain October 8, 1940

4 Claims. (Cl. 117—72)

This invention relates to compositions for use as adhesives for certain polythenes, particularly for attaching to certain metals and other materials comprised in chemical and other plant or articles.

The metals are iron, steel, brass, zinc, aluminium and nickel, and the other materials are stone, brick, earthenware and materials made using Portland cement.

Polythenes are solid polymers of ethylene obtained by effecting polymerisation under very high pressure at raised temperature, with or without a small proportion of oxygen, as described for example in specification No. 471,590. The polymers which are used in this invention are those which do not melt below about 100° C.

We have found that by incorporating together 1–2 parts of one of the said polythenes and 1 part of a cyclo-rubber, compositions are obtained which upon heating become plastic or viscid and adhesive, and can then be used for bonding the said polythenes to the above mentioned materials.

The said polythenes resemble the paraffin waxes in their high resistance to most chemical agencies. The paraffin waxes are of little use for chemically resistant purposes because of their low melting points and soft brittle nature. By the present invention it is possible to obtain, inter alia, vats, pans or other vessels with durable linings of high chemical resistance. The invention is also of value in the production of electrical equipment for which purpose the said polythenes are of great value because of their excellent insulating properties.

Cycle-rubbers are a well known class of substances which are obtained from natural rubber by the action of acid reagents and heat; see for example the paper "Rubber Derivatives" by P. Schidrowitz, Trans. Inst. Rub. Ind., 11, 458 et seq. They are generally regarded as isomeric derivatives of rubber having a lower degree of unsaturation than rubber, and it is thought that in the process of their production from rubber internal linkages form among the double bonds, giving rings or connected chairs of carbon atoms.

In making the adhesive compositions, the incorporation together of the polythene and the cyclo-rubber is effected by mixing them together, for instance by milling them on a heated rubber roller mill. Mixtures of the polythenes and/or mixtures of cyclo-rubbers may be used instead of a single polythene or single cyclo-rubber. Usually, suitable compositions are made using rather less cyclo-rubber than polythene, e. g., 4 parts of polythene to 3 of cyclo-rubber. The most suitable proportions depend to some extent upon the particular polythene and cyclo-rubber used as ingredients and to some extent upon the materials which are to be bonded together, but we do not use proportions outside those of 1–2 parts of polythene to 1 part of cyclo-rubber.

In bonding the polythene to the metal or other material, the polythene adhesive is applied to the preheated metal or other material. The preheating can be effected by any convenient heating means, e. g., by electrical means or blow lamps. The adhesive composition is applied to the heated surface and melted by contact, or if desired the adhesive composition can be heated and then applied. The polythene is then applied, for instance, as preformed sheet, as powder, or as a paste in water.

The following examples in which parts are by weight illustrate but do not limit the invention.

Example 1

An open two-roll rubber mill is heated to about 120° C. 100 parts of polythene (of melting point between 100–110° C.) in powder form are gradually put on the rolls and then, when running in a smooth sheet, 74 parts of the cycle-rubber known as Vulcabond S (the word Vulcabond is a registered trade-mark) are added, in small quantities at a time, and the machine run until thorough admixture has taken place. The product on removing from the roll forms a brown non-tacky sheet.

Example 2

An iron sheet is heated by means of a blow-lamp flame. The product of Example 1 is then melted on to the sheet by working on to the hot surface. A preformed polythene sheet (of melting point about 110° C.) is then quickly applied to the surface and pressed on by a wet roller, rolling from the middle of the sheet outwards. The initial heating should be such that the temperature of the metal is about 300° C. when the adhesive composition is brought into contact with it. The adhesive is applied as quickly as possible and then the polythene sheet worked into position. Finally the sheet and metal can if desired be artificially cooled, e. g., by the application of cold water.

The process of this example may be modified by effecting the coating in sections, where the extent or shape of the surface to be covered is such that a single sheet of the polythene cannot be applied. In this modification, a section of the surface is heated and coated as described in detail above, and then adjacent sections are similarly dealt with. Effective joints between the edges of adjacent sections are easily obtained, and in this jointing operation paraffin wax can be used as a convenient flux.

*Example 3*

A hemispherical iron vessel is heated and the adhesive made according to Example 1, applied. Polythene powder (M. P. 100–110° C.) is then applied to the hot surface by means of a trowel and when melted, lightly pressed and kneaded with a hot tooling iron which is kept coated with molten paraffin wax. Working in this way a seamless covering is given to the whole of the interior of the vessel. Care must be taken not to char the polythene by using the tooling iron too hot.

*Example 4*

An iron T joint is heated and the adhesive prepared as in Example 1, applied to the internal surfaces.

A paste of putty-like consistency made by kneading 100 parts of polythene powder (M. P. 100–110° C.) with 100 parts of water is applied to the hot surface by a trowel and after the water has evaporated is rolled and pressed down to give a uniform covering. On cooling the polythene coating is firmly bonded to the metal.

We claim:

1. A composition for joining a polythene to a base which comprises a mixture of from one to two parts of polymerized ethylene having a melting point above about 100° C. and one part of a cyclo-rubber.

2. As a new article of manufacture a base, an adherent intermediate film of one to two parts of polymerized ethylene and one part of a cyclo-rubber, and a surface film of polymerized ethylene.

3. The article of claim 2 in which the base is metallic.

4. The article of claim 2 in which the base is silicious.

CYRIL LEONARD CHILD.
ROBERT BERTRAM FISHER.
FRANK CLARKE.
BERNARD JAMES HABGOOD